United States Patent
Mohtashemi et al.

(10) Patent No.: US 9,673,701 B2
(45) Date of Patent: Jun. 6, 2017

(54) SLEW RATE ENHANCEMENT FOR TRANSIENT LOAD STEP RESPONSE

(71) Applicant: Apple Inc., Cupertino, CA (US)

(72) Inventors: Behzad Mohtashemi, Cupertino, CA (US); Asif Hussain, San Jose, CA (US); Manisha P. Pandya, Saratoga, CA (US); Mohammad J. Navabi-Shirazi, Cupertino, CA (US); Nileshbhai J. Shah, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/050,152

(22) Filed: Feb. 22, 2016

(65) Prior Publication Data
US 2016/0276928 A1     Sep. 22, 2016

Related U.S. Application Data

(60) Provisional application No. 62/136,058, filed on Mar. 20, 2015.

(51) Int. Cl.
*H02M 3/156* (2006.01)

(52) U.S. Cl.
CPC .... *H02M 3/156* (2013.01); *H02M 2003/1566* (2013.01)

(58) Field of Classification Search
CPC .................................................... H02M 3/156
See application file for complete search history.

(56) References Cited

U.S. PATENT DOCUMENTS

| | | | |
|---|---|---|---|
| 7,719,243 B1 | 5/2010 | Balogh | |
| 8,120,287 B2 | 2/2012 | Lin | |
| 8,575,911 B2* | 11/2013 | Cheng | H02M 1/14 323/283 |
| 2006/0152204 A1* | 7/2006 | Maksimovic | H02M 1/38 323/284 |
| 2014/0254213 A1 | 9/2014 | Matthews | |

* cited by examiner

*Primary Examiner* — Emily P Pham
(74) *Attorney, Agent, or Firm* — Blank Rome LLP

(57) ABSTRACT

A power conversion circuit, such as a buck converter/regulator, includes a feedback loop operatively coupling the output voltage to the controller for the switching mechanism. The feedback loop includes an analog error amplifier that sources current to the controller when the output voltage falls below a predetermined reference voltage and sinks current from the controller when the output voltage rises above a predetermined reference voltage. The feedback loop further includes at least one of a sinking boost circuit that sinks additional current from the controller when the output voltage falls below a low voltage threshold or a sourcing boost circuit that sources additional current to the controller when the output voltage rises above a high voltage threshold. The boost circuits can include analog amplifiers, digital comparators, or a combination thereof.

20 Claims, 7 Drawing Sheets

SLEW RATE ENHANCEMENT FOR TRANSIENT LOAD STEP RESPONSE

BACKGROUND

Electronic devices, and particularly portable electronic devices such as mobile phones, tablet computers, laptop computers and the like, typically rely on battery power. For a variety of reasons relating to various design considerations, the DC voltage available from the battery may not match the voltage required to power the various internal components. Thus, one or more power conversion circuits a/k/a DC-DC converters may be employed.

When an electronic component requires a higher voltage than that supplied by the battery, a boost converter may be employed. Alternatively, when an electronic component requires a lower voltage than that supplied by the battery, a buck converter may be employed. More sophisticated converter designs, such as buck-boost converters, flyback converters, Cuk converters, and the like are also known to those skilled in the art.

Whatever type of converter is used, the voltage output of the converter may not be sufficiently stable for the particular electronic device being powered. In such cases, a voltage regulator may be used. Linear voltage regulators are quite common, but suffer from a disadvantage due to their inherent efficiency. Additionally, the regulator may be integrated with the power converter itself. For example, in some cases, a buck converter may be used as a voltage regulator that operates substantially more efficiently than a conventional linear regulator.

One issue that has presented itself with respect to such circuits is the response time of the circuit to changes in the load and the deleterious effect this can have on the output voltage. For example, a substantial increase in the load on the circuit, such as that caused by a device switching on or coming out of a power saving mode, may cause a decrease in output voltage below a desired value. Alternatively, a substantial decrease in the load on the circuit, such as that caused by a device switching off or entering a power saving mode, may cause an increase in output voltage above a desired value. In either case, proper and/or reliable operation of the load may be compromised by these voltage transients. Thus, improved circuits and techniques for dealing with such load transients are desirable.

SUMMARY

A power conversion apparatus can include a power converter, such as a buck converter, comprising one or more switching devices as well as a controller configured to operate the one or more switching devices so as to convert an input voltage to a regulated output voltage for delivery to a load. The apparatus can further include a feedback loop monitoring the regulated output voltage and operatively coupled to the controller so as to adapt operation of the power converter to maintain the second regulated voltage at a desired level. The feedback loop can include an error amplifier configured to compare an output voltage signal to a first reference signal and to source or sink current to or from the controller in response the difference between these signals. The feedback loop can further include a sourcing boost circuit and a sinking boost circuit.

The sourcing boost circuit can be configured to compare the output voltage signal to a second reference signal and to source additional current to the controller in response thereto. The sinking boost circuit can be configured to compare the output voltage signal to a third reference signal and to sink additional current from the controller in response thereto.

In the power conversion circuit discussed above, the sourcing boost circuit and/or the sinking boost circuit can each comprise an analog amplifier and/or a digital comparator. The sourcing boost circuit and/or the sinking boost circuit can further include one or more diodes, wherein the diode of the sourcing boost circuit blocks the sourcing boost circuit from sinking current and wherein the diode of the sinking boost circuit blocks the sinking boost circuit from sourcing current. When digital comparators are used in conjunction with the analog amplifiers, the digital comparator of the sourcing boost circuit can compare the output voltage to a fourth reference signal, and the digital comparator of the sinking boost circuit can compare the output voltage to a fifth reference signal.

In any embodiment in which the comparators are used, the sourcing boost circuits can include a first current source and a switch actuated by the digital comparator of the sourcing boost circuit to source additional current to the controller using the first current source. Similarly, the sinking boost circuits can include a second current source and a switch actuated by the digital comparator of the sinking boost circuit to sink additional current from the controller using the second current source.

A method of operating a power conversion circuit, such as a buck converter, that includes one or more switching devices and a controller operating the one or more switching devices to produce a regulated output voltage can include detecting, with an error amplifier, a difference between the regulated output voltage and a reference voltage and in response to the difference sinking or sourcing a current to the controller. The method can further include using at least one of a sinking boost circuit and a sourcing boost circuit to detect whether the regulated output voltage exceeds a high voltage threshold or falls below a low voltage threshold. The method can further include using the sinking boost circuit to sink additional current from the controller if the high voltage threshold is exceeded or using the sourcing boost circuit to source additional current to the controller if the low voltage threshold is exceeded.

Either or both of the sinking and sourcing boost circuits can include an analog amplifier and/or a digital comparator. If an analog amplifier and cascaded digital comparator are used in either of the boost circuits, the analog amplifier stages can compare the regulated output voltage to a set of first high and low voltage thresholds, while the digital comparators compare the regulated output voltage to a second set of high and low voltage thresholds of greater magnitude.

DETAILED DESCRIPTION

Figure 1:
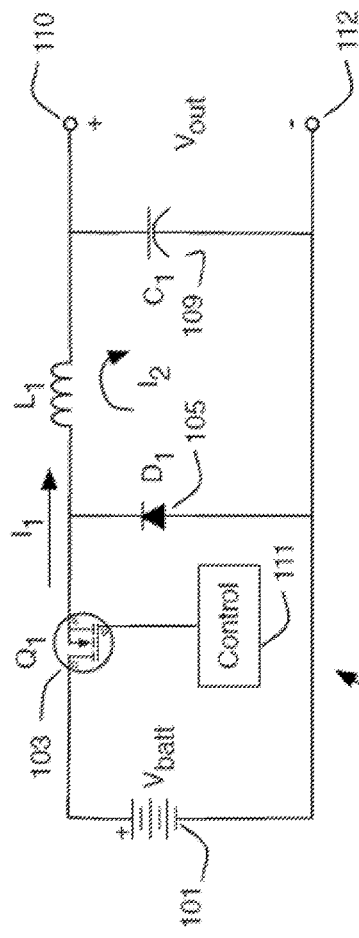
FIG. 1 illustrates a high level schematic of a buck converter/regulator.

FIG. 1 illustrates a high level schematic of a typical buck converter/regulator 100. Configuration and operation of the buck converter/regulator 100 is as follows: battery 101 supplies a voltage Vbatt and is coupled to an input side of switch Q1 103 (e.g., the source of a field effect transistor or "FET"). The output side of switch Q1 103 (e.g., the drain of a FET) is coupled to a cathode of diode D1 105 and to one terminal of an inductor L1 107. The other terminal of inductor L1 107 is connected to a first terminal of capacitor C1 109 and also serves as the positive output terminal 110 of the circuit 100. The anode of diode D1 105 is coupled to the negative terminal of the battery 101 as well as the other terminal of capacitor C1 109, which is also the negative output terminal 112 of the circuit 100.

Control circuit 111 monitors the output voltage Vout between output terminals 110 and 112 and controls the switching of Q1 103 to produce the desired output voltage. Typically, control circuit 111 operates with a pulse width modulation or similar control scheme in which the duty cycle of switch Q1 103 is modulated to produce the desired output voltage Vout for a variety of load conditions. More specifically, to transfer energy from the battery to the load side of the circuit, switch Q1 103 is closed. This causes a current flow I1 from the battery 101, through switch Q1 103, through inductor L1 107 and then to the load (not shown) and/or to capacitor C1 107, thereby charging capacitor C1 107. When switch Q1 103 is opened, current flow from the battery stops, and current I2 (which at the instant switch Q1 103 opens is equal to I1) begins to flow through Inductor L1, capacitor C1, and diode D1. This facilitates transfer of energy stored in inductor L1 107 and capacitor C1 109 is transferred to the load.

Figure 2:
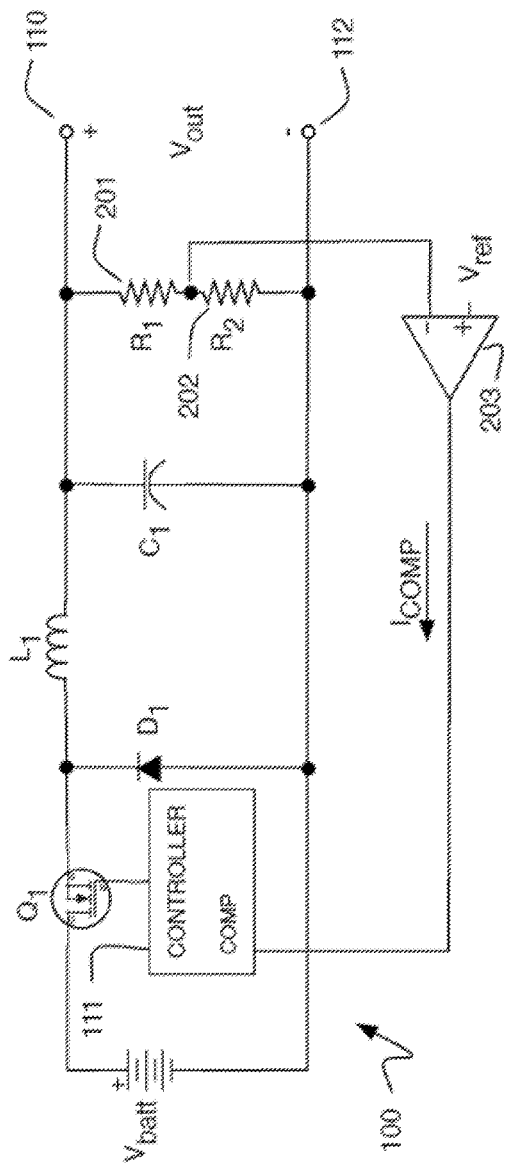
FIG. 2 illustrates a more detailed schematic of a buck converter/regulator.

FIG. 2 illustrates a slightly more detailed schematic of the buck converter/regulator illustrated in FIG. 1. More specifically, the output voltage feedback loop is depicted. In general, voltage-regulated power converters include a feedback loop that facilitates control of the output voltage. Although these feedback circuits may take a variety of forms, it is fairly typical for the output voltage (or a signal based thereon or derived therefrom in a predetermined way) to be compared to a reference voltage that is the desired output voltage, or is based thereon, or is derived therefrom in a predetermined way. The difference between these values, i.e., the difference between the current output voltage and the desired output voltage, is then used as a control input to the converter circuit. This difference can be derived by an error amplifier or other such structure. In many embodiments, if the output voltage is greater than the desired output voltage, the feedback circuit sinks current from the compensation node of the controller, which causes the control circuit to adjust the switching cycle so as to decrease the output voltage. Similarly, if the output voltage is less than the desired output voltage, the feedback circuit sources current to the compensation node of the controller, which causes the control circuit to adjust the switching cycle so as to increase the output voltage. Variations of such control circuits are known in the art.

Turning now to FIG. 2, further details of one such feedback circuit are depicted. A voltage divider made up of series-connected resistors R1 201 and R2 202 is connected across the output terminals 110 and 112. The center of this voltage divider is connected an input of error amplifier 203. The voltage at this point is proportional to, but smaller than the output voltage. (The voltage divider is not necessarily required, depending on the output voltage and the input voltage rating of error amplifier 203. In some cases, the output voltage may be directly connected to the error amplifier.)

A reference voltage Vref, either the desired output voltage or a voltage that is based thereon or related thereto in some predetermined way, is also connected to an input of error amplifier 203. If the other input of the error amplifier is the output voltage, then Vref can be the desired output voltage. Alternatively, if the other input of the error amplifier is a scaled voltage that is proportional to the actual output voltage, then Vref can be a similarly scaled proportion of the desired output voltage. In any case, the difference between the two error amplifier inputs will cause a current ICOMP to flow from the output of the error amplifier 203 into the external compensation node of controller 111. In the illustrated embodiment, because Vref is connected to the non-inverting input and Vout is connected to the inverting input, if the output voltage Vout is greater than the desired value, ICOMP will be negative, sinking current from the controller 111. This will cause the controller to decrease the duty cycle of switch Q1. Conversely, if output voltage Vout is lower than the desired value, ICOMP will be positive, sourcing current into controller 111, which will cause controller 111 to increase the duty cycle of switch Q1. Controller 111 could also be designed to have the opposite response, namely a sinking current could increase the duty cycle of switch Q1, while a sourced current could decrease the duty cycle of switch Q1. In such a case, Vref would be connected to the inverting input, with Vout connected to the non-inverting input.

A wide variety of commercially available power supply controllers feature such external compensation loops. Thus, the internal design details of the controller 111 are not repeated herein. It should be noted that the teachings of the present disclosure may be used with such controllers. Alternatively, a custom controller could be designed from discrete components or as a custom integrated circuit operating according to known principles having such an external compensation node.

Figure 3:
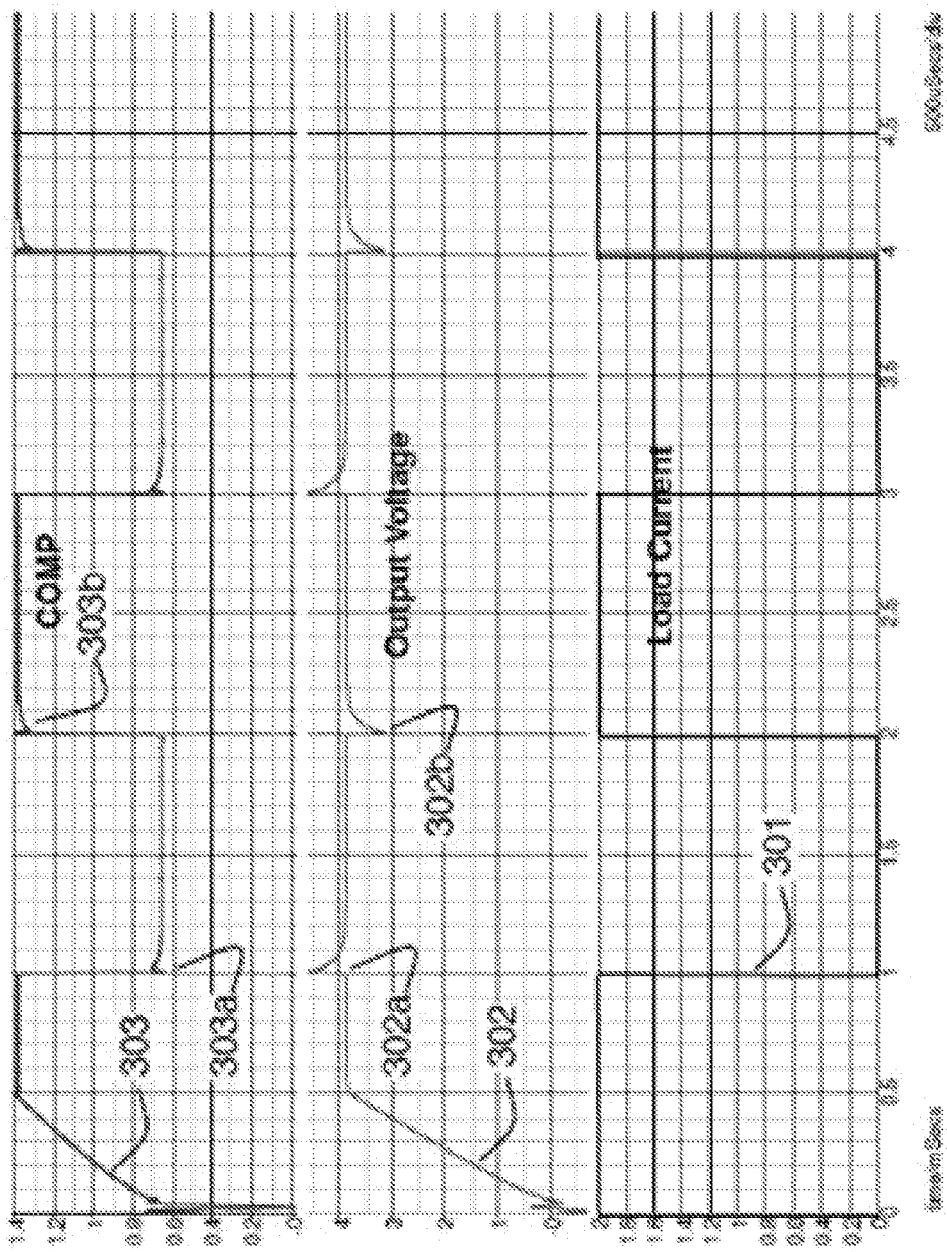
FIG. 3 illustrates a series of voltage and current traces from a buck converter/regulator experiencing load transients.

As noted above, significant load transients can cause the output voltage of buck converter/regulator 100 to fluctuate undesirably, particularly the magnitude of such fluctuations can be undesirable. An example of output waveforms illustrating such fluctuations are illustrated in FIG. 3. More specifically, lowermost trace 301 indicates an exemplary output current (in Amperes). As can be seen the load changes in 1 ms intervals from a high value of 2 A to a low value of 0. This is illustrative of a load switching on and off, such as might be encountered in a processor enters a power saving mode, a radio (such as a cellular, Bluetooth, or WiFi radio) is switched on or off with use, etc.

Center trace 302 illustrates the output voltage Vout (FIGS. 1 & 2) during the load transients. At each load turn-off transient, there is a small output voltage overshoot 302a. These voltage overshoots 302a are generally decaying exponential in shape, having a peak magnitude of approximately 0.5 V above the nominal output voltage and a total duration of roughly 0.1 ms. Similarly, for each load turn-on transient, there is a small output voltage dip 302b. These voltage undershoots are generally decaying exponential in shape, having a peak magnitude of −0.8 V below the nominal output voltage and a total duration of roughly 0.2 ms. It is noted that these values are simulated values, and the specific magnitudes and durations may vary with different applications, but the general principles are the same.

Upper trace 303 illustrates the voltage at the COMP node of controller 111. The load current changes shown in trace 301 result in related changes in the voltage of the COMP node. As can be further seen, the COMP node voltage will reach a stable value determined by a combination of the output voltage (trace 302) and the output current (trace 301). More specifically, when the load current is high and the output voltage is at its nominal value, the COMP node voltage stabilizes around 1.4 V. When the load current is low and the output voltage is at its nominal value, the COMP node voltage stabilizes around 0.7 V. In the brief period around the load transients where the output voltage is overshooting (302a) or dipping (302b), there is a related transient in the COMP node voltage as the control system attempts to correct this droop. These can be seen as slight COMP node voltage transients 303a relating to voltage overshoots 302a and 303b related to voltage undershoots 302b.

As will be appreciated by those skilled in the art, the voltage overshoots 302a and undershoots 302b are a function of two primary factors. A first factor is the signal bandwidth of the system, i.e., how fast the control system can respond to load changes. Generally, this bandwidth is a function of a number of design choices a designer must make in terms of component values, costs, and stability. Component parameters may be selected to enhance the bandwidth of the system, but there are also countervailing considerations in terms of component size, cost, and the other performance parameters of the circuit. Relatedly, designing control circuits with higher bandwidths may come at higher costs, both in terms of the number and quality of components required, as well as the space available for them, their effect on power consumption or efficiency, etc. Finally, stability concerns can arise because, in many cases, the faster a control system can respond, the more likely it is to encounter stability problems. Thus, a circuit designer is faced with a series of tradeoffs that must be made to design a control system that is fast enough to produce a desired output voltage transient range within the constrains posed by other considerations.

The second factor affecting the voltage overshoots 302a and undershoots 302b is the limited current that can be sourced or sinked from error amplifier 203. In general, the control systems implemented by controllers 111 will have some sort of internal capacitor that is charged or discharged by the sourcing or sinking of current from error amplifier 203. For any given capacitor size, increased current sourcing or sinking from error amplifier 203 will improve the response time of the circuit. However, the current sourcing or sinking capability of error amplifier 203 is again a function of components used, costs, and stability considerations. In general, designing an error amplifier system 203 that has a higher current sourcing or sinking capability will result in a more expensive design, whether because of component count or quality or a combination thereof. Additionally, higher current-capable amplifiers may introduce their own stability problems.

Figure 4:
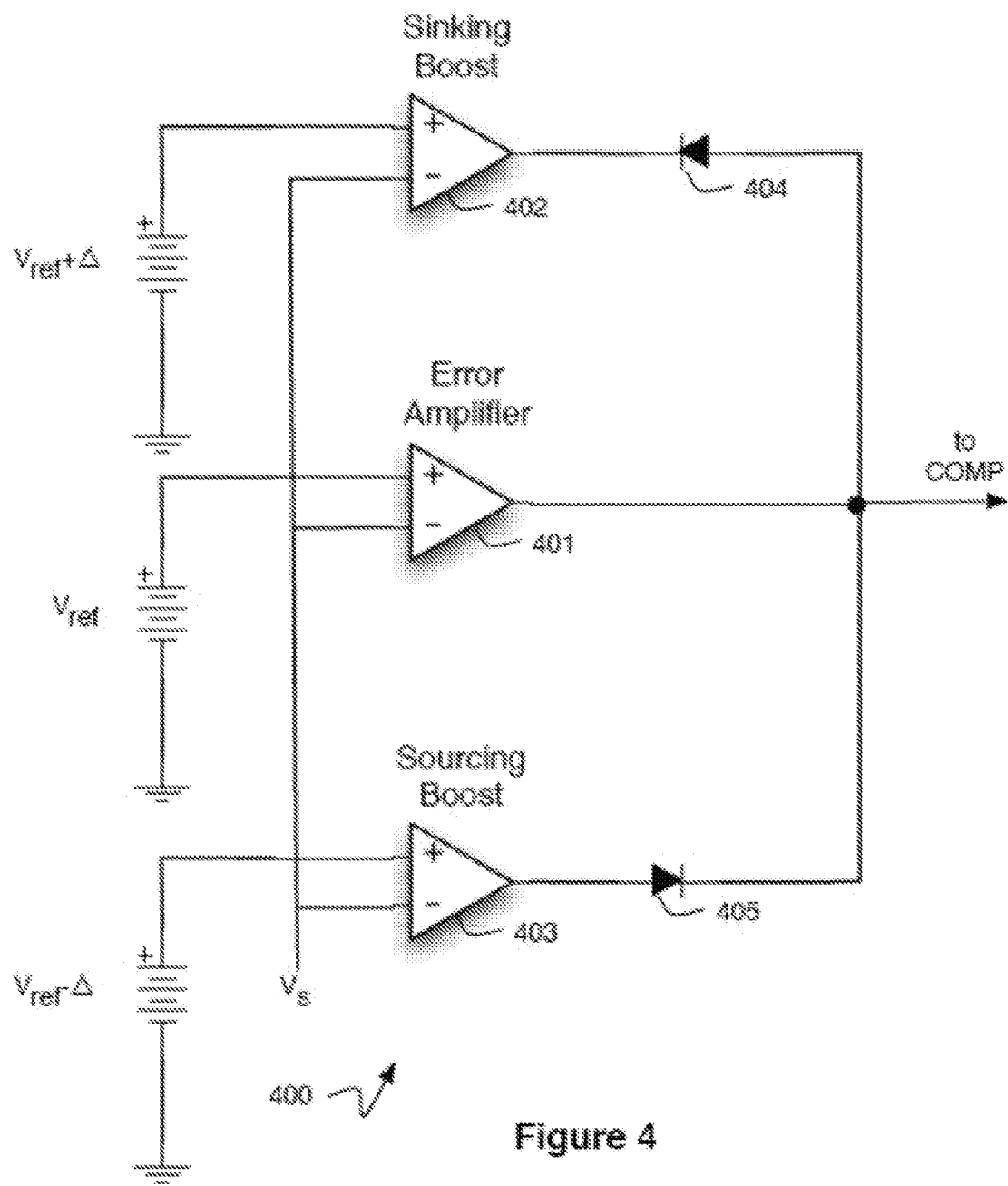
FIG. 4 illustrates an analog compensation feedback loop circuit.

One design for a compensation feedback loop circuit 400 that addresses these issues is illustrated in FIG. 4. Analog compensation feedback loop circuit 400 includes an error amplifier 401 that operates similarly to error amplifier 203 discussed above. More specifically, error amplifier 401 has one input connected to an output voltage signal (Vs, i.e., a signal that is the output voltage or related to the output voltage in some predetermined way) and the other input connected to a reference voltage (i.e., a signal that is the desired output voltage or related to the desired output voltage in some predetermined way). As a result, the error amplifier will output a current that is proportional to the difference between the output voltage signal and the reference voltage (and thus also proportional to the difference between the converter/regulator output voltage and the desired converter/regulator output voltage). In the illustrated embodiment, the amplifier will source current if the output voltage signal is below the Vref and will sink current if the output voltage signal is above Vref, but, as explained above, the circuit could be configured to operate in the opposite sense.

In the illustrated embodiment, if the output voltage signal (Vs) increases above the desired value (Vref), error amplifier 401 will sink current from the COMP node of controller 111, thereby decreasing the output voltage of the converter/regulator 100. Conversely, if the output voltage signal decreases below the desired value (Vref), error amplifier 401 will source current to the COMP node of controller 111, thereby increasing the output voltage of the converter/regulator 100. This operation is generally as described above.

Additionally, illustrated analog compensation feedback loop circuit 400 includes two additional circuits, a sinking boost circuit and sourcing boost circuit. In the embodiment of FIG. 4, the sinking boost circuit includes sinking boost amplifier 402. Like error amplifier 401, sinking boost amplifier 402 has one input connected to the output voltage signal (Vs). However, the other input of sinking boost amplifier 402 is connected to a high voltage reference signal Vref+Δ, which is higher than Vref and is thus a high output voltage threshold. Additionally, the output of sinking boost amplifier 402 is connected to the COMP node of controller 111 by diode 404.

Operation of the sinking boost circuit is as follows: Whenever the output voltage signal Vs is less than the high voltage reference Vref+Δ, meaning that the output voltage of the converter/regulator 100 is less than some predetermined high voltage threshold, sinking boost amplifier 402 attempts to source current to the COMP node of controller 111. However, this current flow is blocked by the reverse-biased diode 404. Conversely, whenever Vs is greater than the high voltage reference Vref+Δ, meaning that the output voltage of the converter/regulator 100 is greater than the predetermined high voltage threshold, the output of sinking boost amplifier 402 sinks current from the COMP node of controller 111 through now forward-biased diode 404. Thus, whenever the output voltage of the converter/regulator circuit 100 is below the predetermined high voltage threshold, the sinking boost circuit does not affect operation of controller 111 and does not affect the output voltage of the converter/regulator 100. However, whenever the output voltage of the converter/regulator circuit 100 is above the predetermined high voltage threshold, the sinking boost circuit adds additional current sinking capability on top of that provided by error amplifier 401. This improves the response of controller 111, thus minimizing any voltage overshoot/undershoot.

In the analog embodiment of FIG. 4, the sourcing boost circuit also includes sourcing boost amplifier 403. Like error amplifier 401, sourcing boost amplifier 403 has one input connected to the output voltage signal (Vs). However, the other input of sourcing boost amplifier 403 is connected to a low voltage reference signal Vref−Δ, which is lower than Vref and is thus a low output voltage threshold. Additionally the output of sourcing boost amplifier 403 is connected to the COMP node of controller 111 by diode 405.

Operation of the sourcing boost circuit is as follows: Whenever the output voltage signal Vs is greater than the low voltage reference Vref−Δ, meaning that the output voltage of the converter/regulator 100 is greater than some predetermined low voltage value, sourcing boost amplifier 403 attempts to sink current from the COMP node of controller 111. However, this current is blocked by the reverse-biased diode 405. Conversely, whenever Vs is less than the low voltage reference Vref−Δ, meaning that the output voltage of the converter/regulator 100 is less than the predetermined low voltage threshold, the output of sourcing boost amplifier 403 sources current to the COMP node of controller 111 through now forward-biased diode 405. Thus, whenever the output voltage of the converter/regulator circuit 100 is above the predetermined low voltage threshold, the sourcing boost circuit does not affect operation of controller 111 and does not affect the output voltage of the converter/regulator 100. However, whenever the output voltage of the converter/regulator circuit 100 is below the predetermined low voltage threshold, the sourcing boost circuit adds additional current sourcing capability on top of that provided by error amplifier 401. This improves the response of controller 111, thus minimizing any voltage dip.

Another variation of the analog boost circuit arrangement of FIG. 4 can include multiple sinking boost and/or sourcing boost circuits. For example, a first sinking boost circuit could activate at a first high voltage threshold (as illustrated) and a second sinking boost circuit (not shown) could be configured to activate and sink still further current at a second high voltage threshold higher than the first high voltage threshold. Similarly, a first sourcing boost circuit could activate at a first low voltage threshold (as illustrated) and a second sourcing boost circuit (not shown) could be configured to activate at a second low voltage threshold lower than the first low voltage threshold. Other variations could include only a sinking boost circuit (or circuits) or only a sourcing boost circuit (or circuits). Additionally, the high and low voltage thresholds could be selected to be the same increase/decrease with respect to the reference voltage or could be selected to be a different increase/decrease depending on the specifics of a particular system and the designer's goals and objectives.

Figure 5:
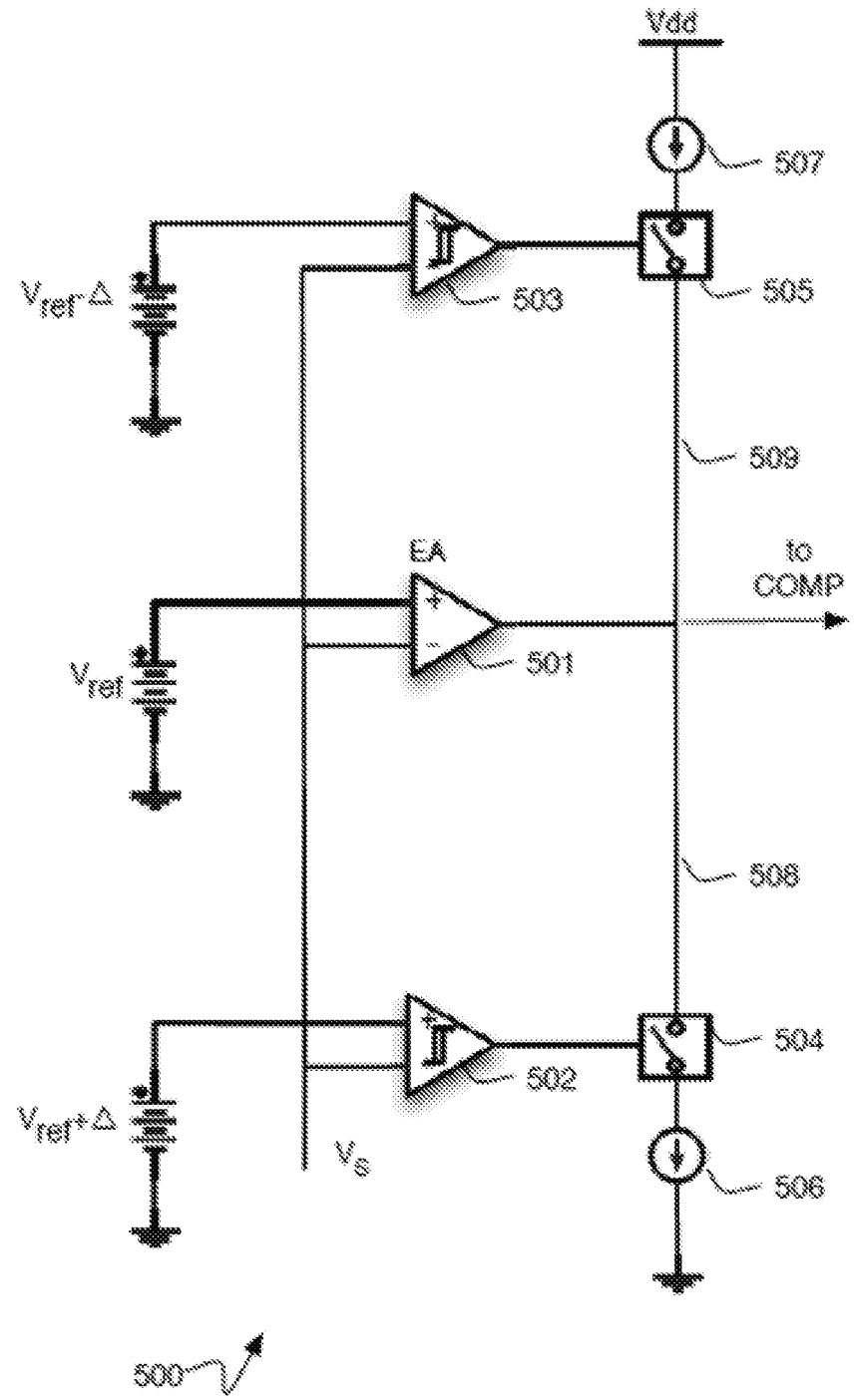
FIG. 5 illustrates a digital compensation feedback loop circuit.

Another design for a compensation feedback loop circuit 500 is illustrated in FIG. 5. Digital compensation feedback loop circuit 500 includes an analog error amplifier 501 that is similar in form and operation to error amplifier 401 discussed above. As described above, if the output voltage signal (Vs) increases above the reference voltage (Vref), error amplifier 501 will sink current from the COMP node of controller 111, thereby decreasing the output voltage of the converter/regulator 100. Conversely, if the output voltage signal (Vs) decreases below the reference voltage (Vref), error amplifier 501 will source current to the COMP node of controller 111, thereby increasing the output voltage of converter/regulator 100. (As described above, the circuit could also be configured to operate in the reverse sense, i.e., sinking current for a voltage decrease and sourcing current for a voltage increase.) This operation is generally as described above.

Additionally, and similarly to the analog embodiment of FIG. 4 discussed above, digital compensation feedback loop circuit 500 includes two additional circuits, a sinking boost circuit and sourcing boost circuit. In the embodiment of FIG. 5, the sinking boost circuit includes sinking boost comparator 502. Sinking boost comparator 502 is configured to compare output voltage signal (Vs) to a high voltage reference signal Vref+Δ, which is higher than Vref and is thus a high output voltage threshold. The output of the comparator is connected to the control input of switching device 504.

Operation of the sinking boost circuit is as follows: Whenever the output voltage signal Vs is greater than the high voltage reference Vref+Δ, meaning that the output voltage of the converter/regulator 100 is greater than the predetermined high voltage threshold, the output of sinking boost comparator 502 presents a logic high value, which closes switch 504. This allows current source 506 to sink additional current from the COMP node of controller 111. Conversely, whenever the output voltage signal Vs is less than the high voltage reference Vref+Δ, meaning that the output voltage of the converter/regulator 100 is less than some predetermined high voltage threshold, sinking boost comparator 502 generates a logic low at its output, which opens switching device 504. This prevents current flow through branch 508. Thus, whenever the output voltage of the converter/regulator circuit 100 is below the predetermined high voltage threshold, the sinking boost circuit does not affect operation of controller 111 and does not affect the output voltage of the converter/regulator 100. However, whenever the output voltage of the converter/regulator circuit 100 is above the predetermined high voltage threshold, the sinking boost circuit adds additional current sinking capability on top of that provided by error amplifier 501. This improves the response of controller 111, thus minimizing any voltage overshoot/undershoot.

In the embodiment of FIG. 5, the sourcing boost circuit includes sourcing boost comparator 403. Sourcing boost comparator 503 is configured to compare the output voltage signal (Vs) to a low voltage reference signal Vref−Δ, which is lower than Vref and is thus a low output voltage threshold. The output of the comparator is connected to the control input of switching device 505.

Operation of the sourcing boost circuit is as follows: Whenever output voltage signal Vs is less than the low voltage reference Vref−Δ, meaning that the output voltage of the converter/regulator 100 is less than the predetermined low voltage threshold, the output of sourcing boost comparator 503 presents a logic high value, which closes switch 505. This allows current source 507 to source additional current to the COMP node of controller 111. Conversely, whenever the output voltage signal Vs is greater than the low voltage reference Vref−Δ, meaning that the output voltage of the converter/regulator 100 is greater than some predetermined low voltage threshold, sinking boost comparator 503 generates a logic low at its output, which opens switching device 504. This prevents current flow through branch 509. Thus, whenever the output voltage of the converter/regulator circuit 100 is above the predetermined low voltage threshold, the sinking boost circuit does not affect operation of controller 111 and does not affect the output voltage of the converter/regulator 100. However, whenever the output voltage of the converter/regulator circuit 100 is below the predetermined low voltage threshold, the sourcing boost circuit adds additional current sourcing capability on top of that provided by error amplifier 501. This improves the response of controller 111, thus minimizing any voltage dip.

As will be appreciated by those skilled in the art having the benefit of this disclosure, whether the compensation feedback loop circuit is implemented in analog form, as illustrated in FIG. 4, or digital form, as illustrated in FIG. 5, is a matter of design choice as to what is best for a particular application. Various factors may be considered, such as cost, control, etc. As to cost, it is likely that a digital implementation would be cheaper in at least some embodiments. However, a digital implementation provides a current sink or source boost that is fixed. In other words, whenever the digital sink or source boost circuits are triggered, they are triggered at their full rated current. Conversely, an analog circuit would respond somewhat proportionally to the extent to which Vs exceeds Vref+/−Δ. In some embodiments this type of arrangement might prove more desirable.

Further, like the analog embodiment discussed above with reference to FIG. 4, the digital embodiment of FIG. 5 may also be constructed as a cascaded arrangement in which there are multiple sinking and/or sourcing boost circuits. For example, a first sinking boost circuit could activate at a first high voltage threshold (as illustrated) and a second sinking boost circuit (not shown) could be configured to activate and sink still further current at a second high voltage threshold higher than the first high voltage threshold. Similarly, a first sourcing boost circuit could activate at a first low voltage threshold (as illustrated) and a second sourcing boost circuit (not shown) could be configured to activate at a second low voltage threshold lower than the first low voltage threshold. Other variations could include only a sinking boost circuit (or circuits) or only a sourcing boost circuit (or circuits). Additionally, the high and low voltage thresholds could be selected to be the same increase/decrease with respect to the reference voltage or could be selected to be a different increase/decrease depending on the specifics of a particular system and the designer's goals and objectives.

Figure 6:
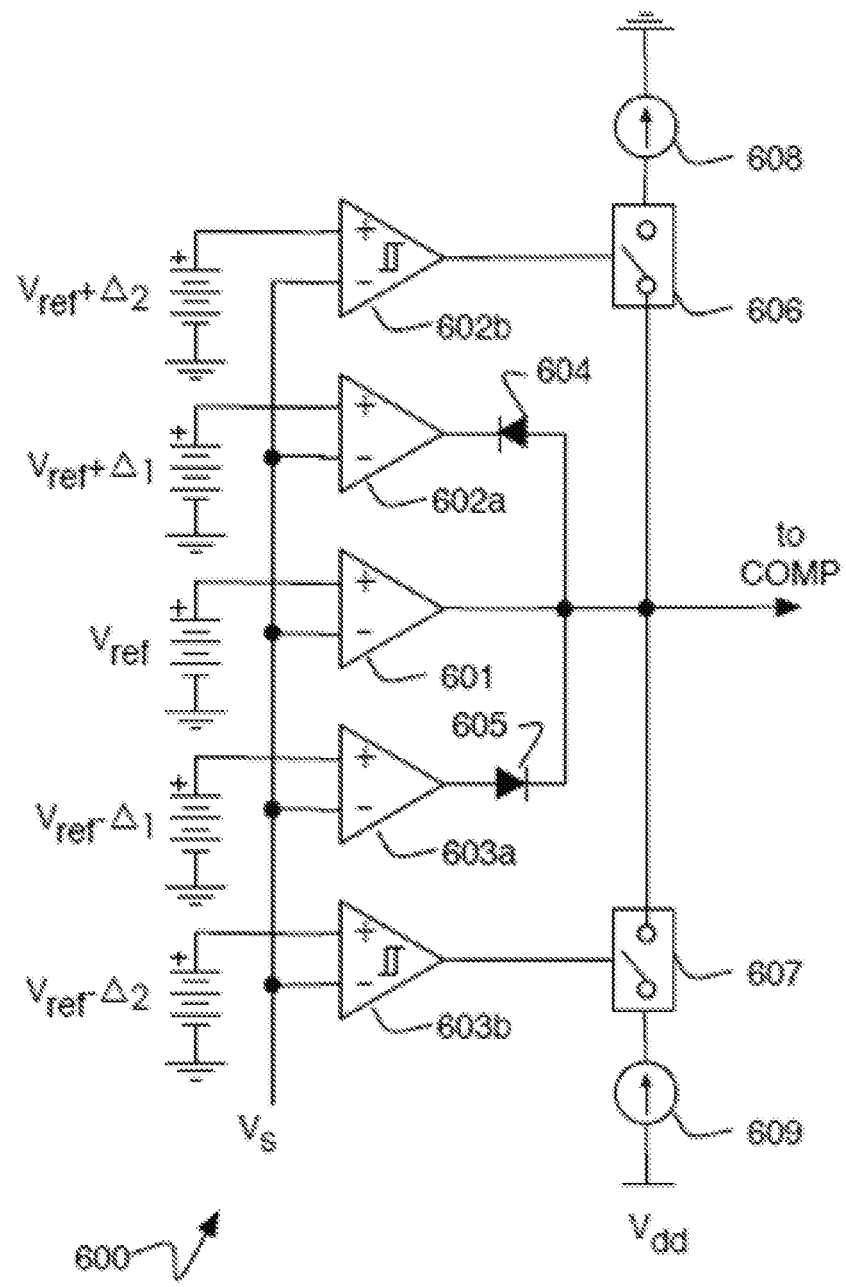
FIG. 6 illustrates a hybrid analog/digital compensation feedback loop circuit.

It is also possible to implement a hybrid digital/analog compensation feedback loop circuit 600 as illustrated in FIG. 6. Hybrid digital/analog compensation feedback loop circuit 600 includes error amplifier 601, which operates as described above with respect to error amplifiers 501, 401, and 203. Namely, error amplifier 601 compares the output voltage signal to a reference voltage and sinks or sources current from the COMP node of controller 111 as required to regulate the output voltage to its desired value. The hybrid digital/analog compensation feedback loop circuit 600 also includes a sinking boost circuit made up of sinking boost amplifier 602a, comparator 602b, diode 604, switch 606 and current source 608 as well as a sourcing boost circuit made up of sourcing boost amplifier 603a, comparator 603b, diode 605, switch 607 and current source 609.

Turning now to the sinking boost circuit illustrated in FIG. 6, sinking boost amplifier 602a acts as a first stage sinking current boost. More specifically, in conjunction with diode 604, sinking boost amplifier 602a operates as described above with respect to sinking boost amplifier 402. Thus, sinking boost amplifier 602a compares the output voltage signal (Vs) to a first high voltage threshold Vref+Δ1 and sinks additional current from the COMP node of controller 111 if this threshold is exceeded. Comparator 602b acts as a second stage sinking current boost. Comparator 602b operates generally as described above with respect to comparator 502 in FIG. 5, but compares the output voltage signal (Vs) to a second high voltage threshold Vref+Δ2 that is higher than the first high voltage threshold Vref+Δ1. When this second high voltage threshold Vref+Δ2 is exceeded, switch 606 is closed, sinking still more current from the COMP node of controller 111.

The sourcing boost circuit illustrated in FIG. 6 is generally similar in construction and principle of operation. Sourcing boost amplifier 603a acts as a first stage sinking current boost. More specifically, in conjunction with diode 605, sourcing boost amplifier 603a operates generally as described above with respect to sourcing boost amplifier 403. Thus, sourcing boost amplifier 603a compares the output voltage signal (Vs) to a first low voltage threshold Vref−Δ1 and sources additional current to the COMP node of controller 111 if this threshold is exceeded. Comparator 603b acts as a second stage sourcing current boost. Comparator 602b operates generally as described above with respect to comparator 503 in FIG. 5, but compares the output voltage signal (Vs) to a second low voltage threshold Vref−Δ2 that is lower than the first low voltage threshold Vref−Δ1. When this second low voltage threshold Vref−Δ2 is exceeded, switch 607 is closed, sourcing still more current to the COMP node of controller 111.

Figure 7A:
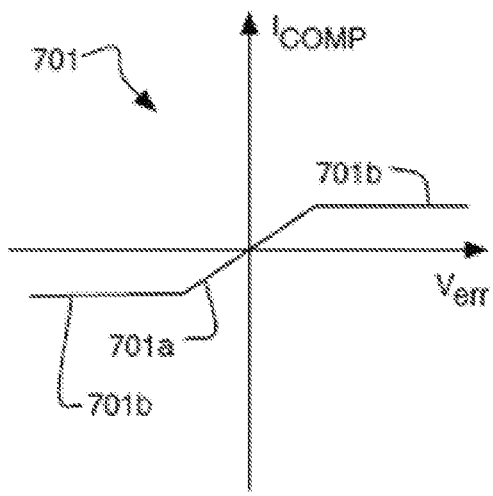
FIGS. 7A-7D illustrate compensation node current curves for various embodiments.

FIGS. 7A-7D illustrate plots of the current being sourced or sinked to the COMP node of controller 111 (ICOMP, see FIG. 2) as a function of the error voltage Verr (i.e., Vref−Vs) when using the various compensation feedback loop circuits disclosed in FIGS. 2-6. FIG. 7A illustrates ICOMP versus Verr for the embodiment of FIG. 2. As can be seen, ICOMP responds linearly in region 701a for relatively smaller Verr values. Outside this region, ICOMP becomes constant in region 701b when the maximum current sinking or sourcing capability of error amplifier 203 is reached. The particular values (e.g., width of linear region 701a and current available in constant region 701b) will vary with the design parameters of error amplifier 203.

Figure 7B:
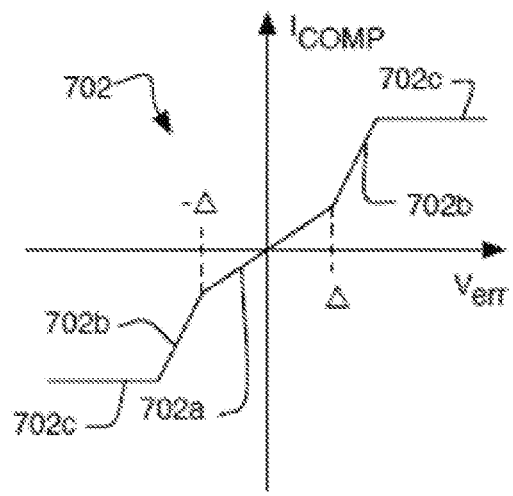

FIG. 7B illustrates ICOMP as a function of Verr for the analog compensation feedback circuit illustrated in FIG. 4. In a first linear region 702a, for Verr values from 0 to +/−Δ, ICOMP responds linearly as error amplifier 401 is sinking/sourcing current. For Verr values greater than +/−Δ, in second linear regions 702b, the slope of ICOMP with Verr increases as error amplifier 401 sources or sinks its maximum current, and boost amplifier 402 or 403 becomes active. Once the current capability of the operating boost amplifier is reached, ICOMP again becomes constant in regions 702c. As with the ICOMP curve in FIG. 7A, the particular values will depend on the design parameters of error amplifier 401, boost amplifiers 402 and 403, and the selected value of Δ, which determines the high and low voltage thresholds as discussed above.

Figure 7C:
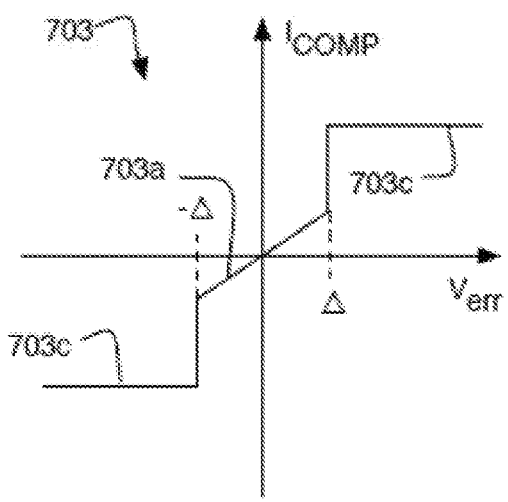

FIG. 7C illustrates ICOMP as a function of Verr for the digital compensation feedback circuit illustrated in FIG. 5. In a first linear region 703a, for Verr values from 0 to +/−Δ, ICOMP responds linearly as error amplifier 401 is sinking/sourcing current. For Verr values greater than +/−Δ, ICOMP steps up nearly instantly into constant region 703c as a result of boost comparator 502 or 503 becoming active. The magnitude of this step is a function of the design of current sources 507 and 506. As above, the selected value of Δ is also a design choice for the difference between the nominal reference voltage and the high/low voltage thresholds.

Figure 7D:
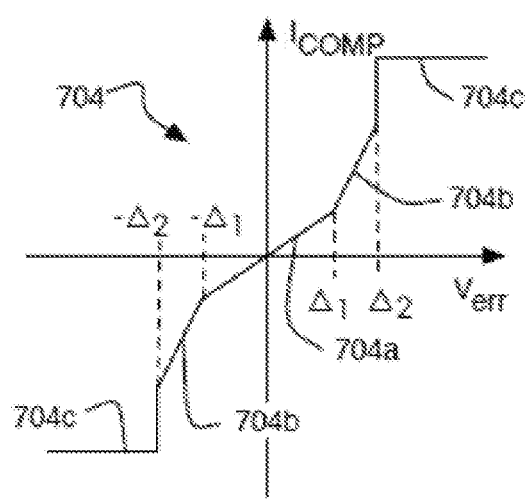

FIG. 7D illustrates ICOMP as a function of Verr for the hybrid analog/digital compensation feedback circuit illustrated in FIG. 6. As can be seen, the ICOMP plot illustrates a combination of the responses illustrated in FIGS. 7B and 7C. More specifically, in a first linear region 704a, for Verr values from 0 to +/−Δ1, ICOMP responds linearly as error amplifier 601 is sinking/sourcing current. For Verr values between Δ1 and Δ2 or −Δ1 and −Δ2, ICOMP is in second linear region 704b, and the slope of ICOMP increases as error amplifier 601 sources or sinks its maximum current, and boost amplifier 602a or 603a becomes active. Once the current capability of the operating boost amplifier is reached at Verr=+/−Δ2, ICOMP steps up nearly instantly into constant region 704c as a result of boost comparator 602b or 603b becoming active. As previously discussed, the slopes of the curves, maximum current values, and voltage thresholds are all selectable design decisions.

Figure 8:
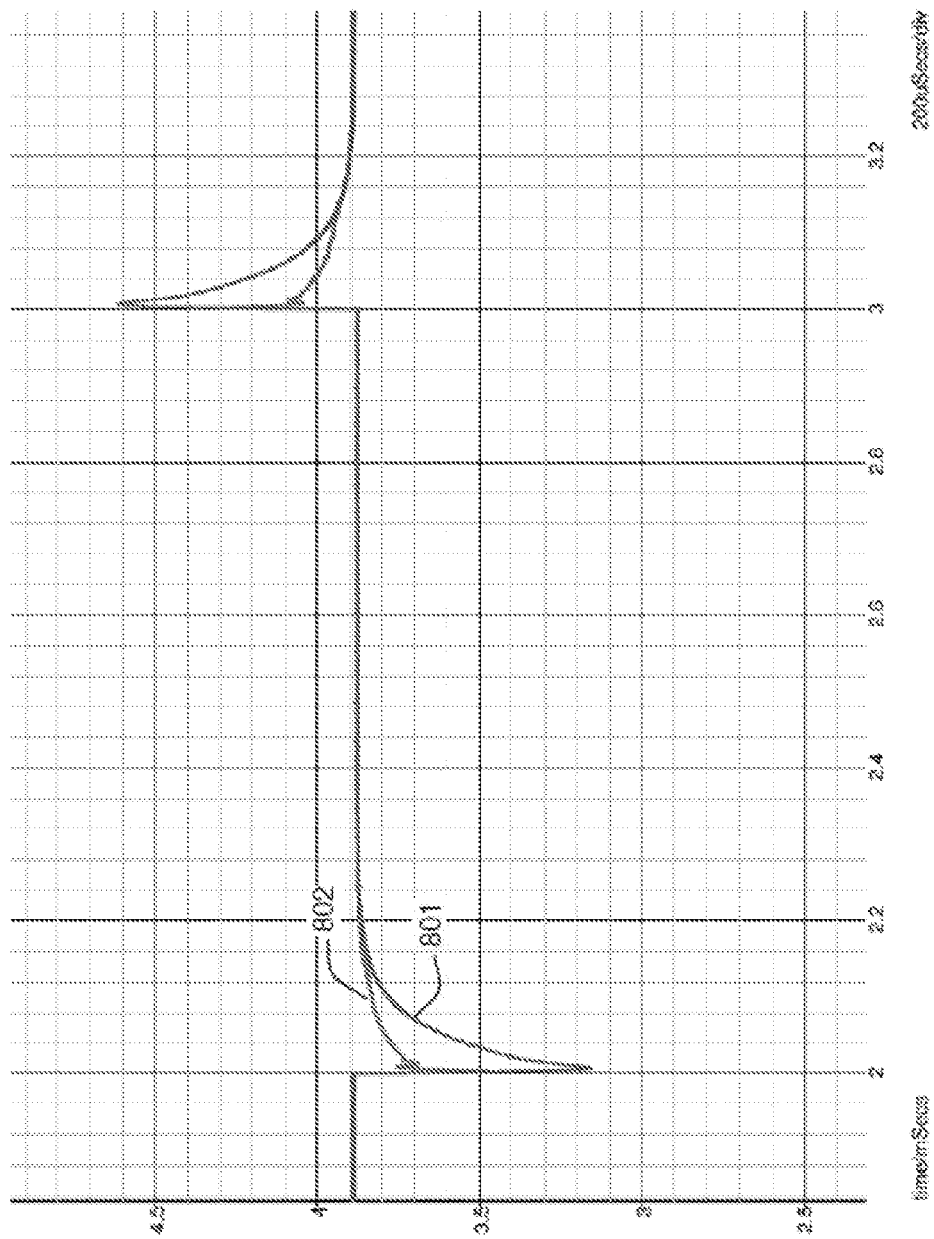
FIG. 8 illustrates output voltage waveforms during transient loads for converters with and without the disclosed boost circuits.

FIG. 8 illustrates simulated output voltages for two different buck converter/regulator circuits, one of which incorporates sinking and sourcing boost circuits as described herein in the feedback loop, and one of which does not. More specifically, voltage trace 801 is for a circuit without the boost circuitry described herein. As can be seen, under a transient load condition, there are voltage overshoots/undershoots of roughly 0.7V decaying over a period of about 0.2 ms. Trace 802 is a simulated result for an otherwise identical buck converter/regulator that includes sinking and sourcing boost circuitry as described herein undergoing the same load transient. As can be seen, the magnitude of the voltage overshoot/undershoot is substantially reduced.

The foregoing description is intended to be illustrative, and not restrictive, of the inventive concepts described herein. Various modifications and adaptations of the concepts described herein will be apparent to the skilled practitioner having benefit of this disclosure. As an example, the values of various electronic components may be selected to comply with any set of design goals and constraints. Similarly, operating voltages and currents may likewise be selected. Additionally, the circuits disclosed herein may be used with any of a variety of solid state power converter topologies, including inverters, rectifiers, DC-DC converters, etc. Moreover, the various voltage thresholds may be selected at any desired value, and need not be symmetric. Thus, the difference between the nominal reference voltage and the high voltage threshold may be greater than, less than, or equal to the difference between the nominal reference voltage and the low voltage threshold. Additionally, multiple analog and/or digital boost circuits may be cascaded in any arrangement deemed suitable by the circuit designer. Moreover, any of the circuits described herein may be implemented using discrete components, integrated circuits, whether off-the-shelf or custom, or any combination thereof. It is intended that these and other variations be considered part of the invention disclosed herein to the extent such fall within the literal or equivalent scope of the following claims.

The invention claimed is:

1. A power conversion apparatus comprising:
   a power converter comprising one or more switching devices;
   a controller configured to operate the one or more switching devices to convert an input voltage to a regulated output voltage for delivery to a load; and
   a feedback loop monitoring the regulated output voltage and operatively coupled to the controller so as to adapt operation of the power converter to maintain the regulated output voltage at a desired level, the feedback loop further comprising:
   an error amplifier configured to compare an output voltage signal to a first reference signal and to source or sink current to the controller so as to reduce a difference between the output voltage signal and the first reference signal;
   a sourcing boost circuit configured to compare the output voltage signal to a second reference signal that is one of a high voltage reference or a low voltage reference and to source additional current to the controller if the output voltage signal rises above the high voltage reference or falls below the low voltage reference; and
   a sinking boost circuit configured to compare the output voltage signal to a third reference signal that is the other of the high voltage reference or the low voltage reference and to sink additional current from the controller if the output voltage signal rises above the high voltage reference or falls below the low voltage reference.

2. The power conversion circuit of claim 1 wherein the sourcing boost circuit and the sinking boost circuit each comprise an analog amplifier.

3. The power conversion circuit of claim 2 wherein the sourcing boost circuit and the sinking boost circuit each comprise a diode wherein the diode of the sourcing boost circuit blocks the sourcing boost circuit from sinking current and wherein the diode of the sinking boost circuit blocks the sinking boost circuit from sourcing current.

4. The power conversion circuit of claim 2 wherein the sourcing boost circuit and the sinking boost circuit each further comprise a digital comparator.

5. The power conversion circuit of claim 4 wherein the digital comparator of the sourcing boost circuit compares the output voltage signal to a fourth reference signal that is one of a second high voltage reference or a second low voltage reference and wherein the digital comparator of the sinking boost circuit compares the output voltage to a fifth reference signal that is the other of the second high voltage reference or the second low voltage reference.

6. The power conversion circuit of claim 5 further comprising:
   a first current source and a switch actuated by the digital comparator of the sourcing boost circuit to source additional current to the controller using the first current source if the output voltage signal rises above the second high voltage reference or falls below the second low voltage reference; and
   a second current source and a switch actuated by the digital comparator of the sinking boost circuit to sink additional current from the controller using the second current source if the output voltage signal rises above the second high voltage reference or falls below the second low voltage reference.

7. The power conversion circuit of claim 1 wherein the sourcing boost circuit and the sinking boost circuit each comprise a digital comparator.

8. The power conversion circuit of claim 7 further comprising:
   a first current source and a switch actuated by the digital comparator of the sourcing boost circuit to source additional current to the controller; and
   a second current source and a switch actuated by the digital comparator of the sinking boost circuit to sink additional current from the controller.

9. The power conversion circuit of claim 1 wherein the power converter is a buck converter.

10. A method of operating a power conversion circuit comprising one or more switching devices and a controller operating the one or more switching devices to produce a regulated output voltage, the method comprising:
    detecting with an error amplifier a difference between the regulated output voltage and a reference voltage and in response to the difference sinking or sourcing a current to the controller; and
    detecting with at least one of:
    a sinking boost circuit whether the regulated output voltage exceeds a high voltage threshold; or
    a sourcing boost circuit whether the regulated output voltage is less than a low voltage threshold; and
    in response to:
    a regulated output voltage exceeding the high voltage threshold, sinking additional current from the controller using the sinking boost circuit; or a regulated output voltage falling below the low voltage threshold, sourcing additional current from the controller using the sourcing boost circuit.

11. The method of claim 10 wherein at least one of the sinking boost circuit or the sourcing boost circuit comprises an analog amplifier.

12. The method of claim 10 wherein at least one of the sinking boost circuit or the sourcing boost circuit comprises a digital comparator.

13. The method of claim 10 wherein at least one of the sinking boost circuit or the sourcing boost circuit comprises a cascaded analog amplifier and digital comparator, wherein the analog amplifier compares the regulated output voltage to a first threshold and wherein the digital comparator compares the regulated voltage to a second threshold of greater magnitude than the first threshold.

14. The method of claim 10 wherein the power conversion circuit is a buck converter.

15. A power conversion apparatus comprising:
a power converter comprising one or more switching devices;
a controller configured to operate the one or more switching devices so as configured to convert an input voltage to a regulated output voltage for delivery to a load; and
means for operatively coupling the controller to the regulated output voltage and sinking current therefrom or sourcing current thereto in response to changes in the regulated output voltage with respect to a reference voltage, said means further comprising at least one boost means for increasing the sourcing or sinking current in response to the regulated output voltage exceeding a high voltage threshold or falling below a low voltage threshold.

16. The power conversion apparatus of claim 15 wherein the means for operatively coupling the controller to the regulated output voltage includes an error amplifier.

17. The power conversion apparatus of claim 16 wherein the means for operatively coupling the controller to the regulated output voltage includes one or more analog amplifiers in addition to the error amplifier.

18. The power conversion apparatus of claim 17 wherein the means for operatively coupling the controller to the regulated output voltage includes one or more digital comparators cascaded with the one or more analog amplifiers.

19. The power conversion apparatus of claim 16 wherein the means for operatively coupling the controller to the regulated output voltage includes one or more digital comparators in addition to the error amplifier.

20. The power conversion apparatus of claim 15 wherein the power converter is a buck converter.

* * * * *